Jan. 16, 1934.    S. ZIED    1,944,053
COVER FOR RUMBLE SEATS OF AUTOMOBILES
Filed May 29, 1933    2 Sheets-Sheet 1

Samuel Zied, INVENTOR
BY Victor J. Evans
ATTORNEY

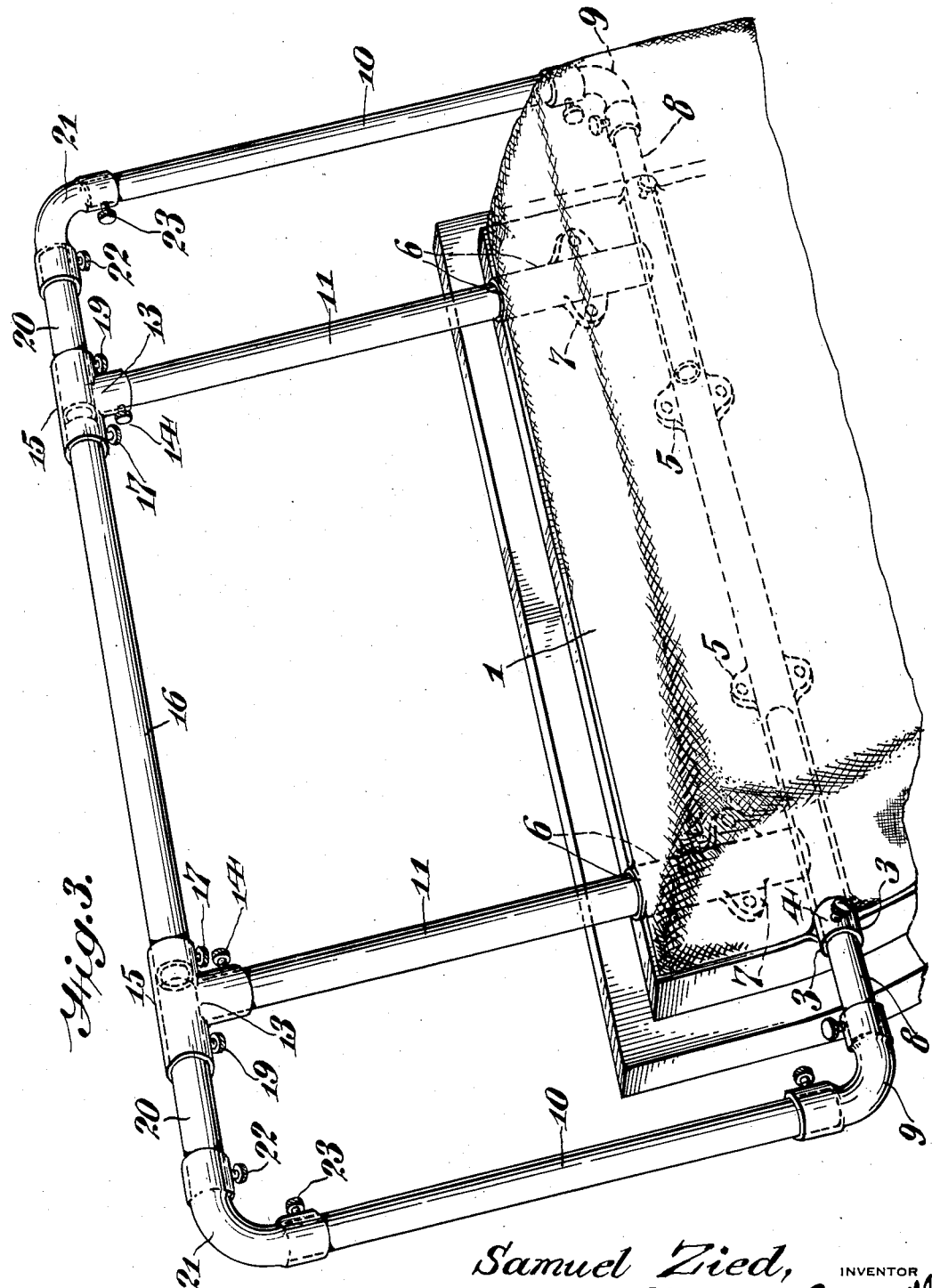

Patented Jan. 16, 1934

1,944,053

UNITED STATES PATENT OFFICE 1,944,053

COVER FOR RUMBLE SEATS OF AUTOMOBILES

Samuel Zied, Philadelphia, Pa.

Application May 29, 1933. Serial No. 673,506

1 Claim. (Cl. 296—99)

This invention relates to an improved supporting means for a cover on a rumble seat of automobiles, such as coupes and the like, and a purpose of the invention is to provide a support comprising horizontally and vertically adjustable telescopical tubular sections, certain of the vertical sections being carried by the back of the rumble seat under the upholstery thereof, while a certain horizontal tubular section is likewise mounted under the upholstery of the back of the rumble seat, the other sections of the support being adjustable vertically and laterally horizontally, in order to properly fit the cover and support the same smooth and taut, there being suitable set screws for holding the various adjustable sections in different positions subsequently to being once set.

Another purpose is to provide a rumble seat cover support, the adjustable movable tubular sections of which can be easily disassembled, and with the cover stored in the compartment where the rumble seat is positioned.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 3 is a perspective view of the entire support for the cover removed, and showing part of the rumble seat back, on which the cover support is mounted.

Figure 1:
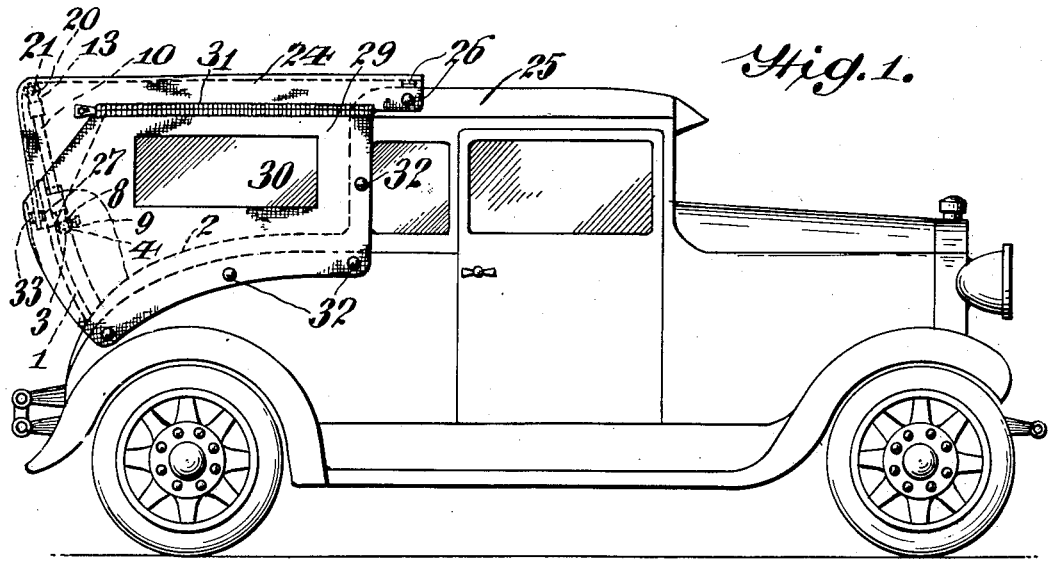
Figure 1 is a view in side elevation of an automobile such as a coupe or the like, showing the back for the rumble seat open and the covering and support applied.
Figure 2:
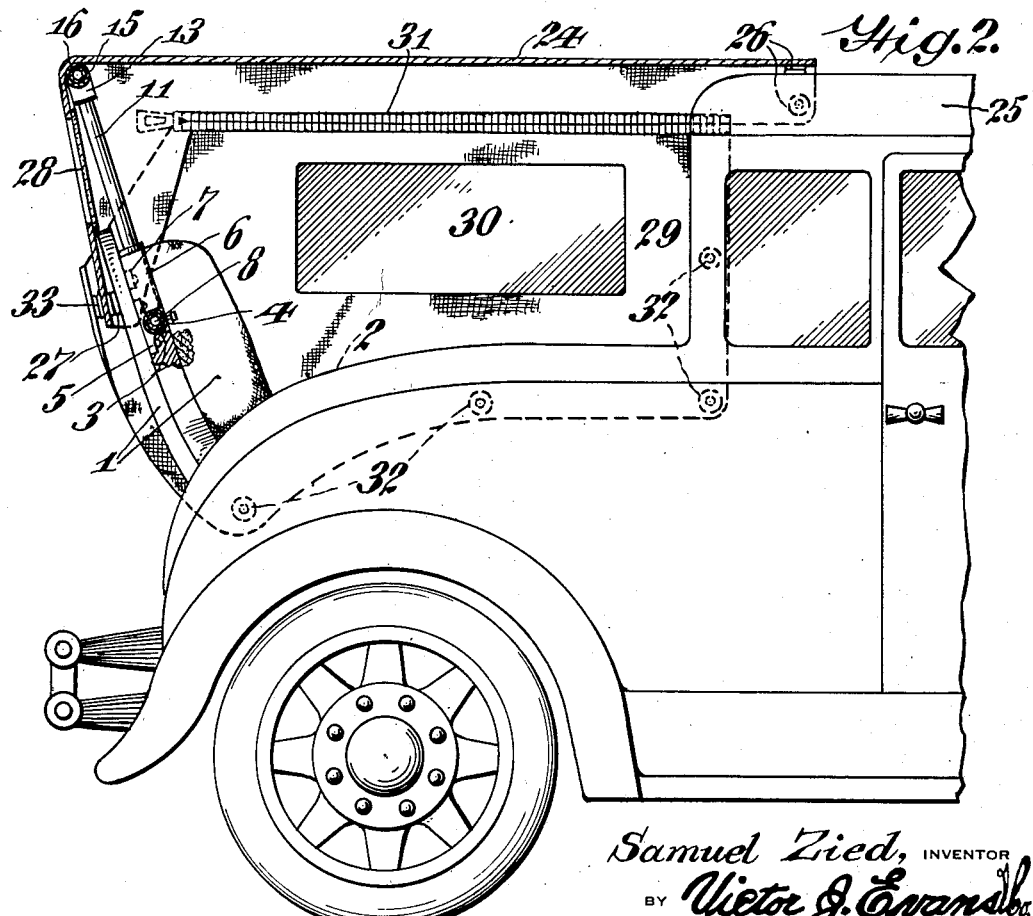
Figure 2 is a vertical sectional view, more clearly showing the mounting and location of certain of the fixed tubular sections of the support, as being carried by the back for the rumble seat.

Referring to the drawings 1 identifies the back of a rumble seat 2 usually constituting an element of a coupe or similar automobile, it being obvious that the back is capable of being opened and closed. Arranged in recesses 3 suitably shaped to receive it, is a tubular guide 4, which extends horizontally of the back 1, the tubular guide having ears 5 to receive suitable fastening means to hold the guide in place. This tubular guide is located under the upholstery of the back.

Disposed substantially vertically on the back adjacent its opposite ends are tubular guides 6, which are also under the upholstery, and have ears 7 to receive fastening means to secure the vertical tubular guides in position.

Telescoping the horizontal tubular guide at opposite ends are tubular rods 8, which have elbows 9 at their remote ends, which are connected telescopically to substantially vertical tubular frame sections 10. Telescopically connected to the vertical tubular guides are tubular rod sections 11, which are held in vertical adjusted positions by frictional engagement in the guides 6. The upper ends of the tubular rod sections 11 telescopically enter certain legs of the T's 13, set screws 14 being used to hold the rod sections 11 in place. The horizontal tubular portions 15 of the T's receive an intermediate tubular rod section 16, there being set screws 17 to hold the parts fixed. Also telescopically entering the horizontal portions of the T's and held in different positions by set screws 19 are tubular rod sections 20, to the remote ends of which elbows 21 are telescopically connected and held in position by set screws 22. These elbows 21 are in turn telescopically fitted to the tubular frame sections 10, and held in place by set screws 23.

By means of the foregoing structure of tubular frame a cover 24 for the rumble seat is supported in position, it being obvious that by adjusting the various tubular frame sections the cover 24 may be held in a smooth taut position. The cover may be constructed of any suitable pliable weatherproof material such as generally used in tops of automobiles. The forward end of the cover is fastened to the usual top 25 of the coupe or similar automobile by means of snap fasteners 26, the cover extends slightly downwardly on opposite sides. The rear lower end of the cover is connected to the exterior face of the rumble seat back, by means of snap fasteners 27, the rear portion of the cover having the usual transparent window sight 28. Suitable side curtains 29 with transparent window sights 30 are connected to the downwardly extending side portions of the cover by means of a conventional zipper fastening 31. The forward ends of the side curtains are connected by means of snap fasteners 32 to the sides of the usual coupe top. The rear end portions of the side curtains extend slightly around the opposite ends of the rumble seat back and are connected to the exterior face of the back by means of snap fasteners 33.

When the cover for the rumble seat is not in use, the supporting frame for the cover composed of the tubular frame sections may be disassembled and rolled in the cover with the side curtains around same and stored in the compartment in which the rumble seat is supported.

The invention having been set forth, what is claimed is:

In a rumble seat cover including a supporting frame, for automobiles, said frame comprising a tubular guide rod section to be disposed horizontally of the rumble seat back and under the upholstery and provided with tubular guides extending at right angles to the first rod section and in a plane parallel with the rumble seat back, tubular rod sections telescoping the horizontally disposed rod section and extending into rod sections at right angles and upwardly and in a plane parallel with the rumble seat back, an upper tubular rod section spaced from but in parallelism to the upper edge of the rumble seat back when opened and having its remote ends connecting said last named upwardly extending rod sections, said upper horizontal rod section consisting of telescopical adjustable portions, certain of said portions having downwardly extending rod sections to telescopically connect with the right angle tubular guides, means for adjustably fastening the various rod sections and tubular guides together, the elements of the frame being adjustably united whereby it may be accommodated to rumble seats of different makes of automobiles, and a covering corresponding to and fitting down over the frame at the back and forwardly of the frame with means at its forward end connecting it to the customary permanent top of the automobile.

SAMUEL ZIED.